April 8, 1969   MITSUO OISO   3,437,854
ELECTRIC ROTARY STEP MOTOR WITH PLURAL OFFSET STATOR WINDINGS
Filed Nov. 4, 1966   Sheet 1 of 3

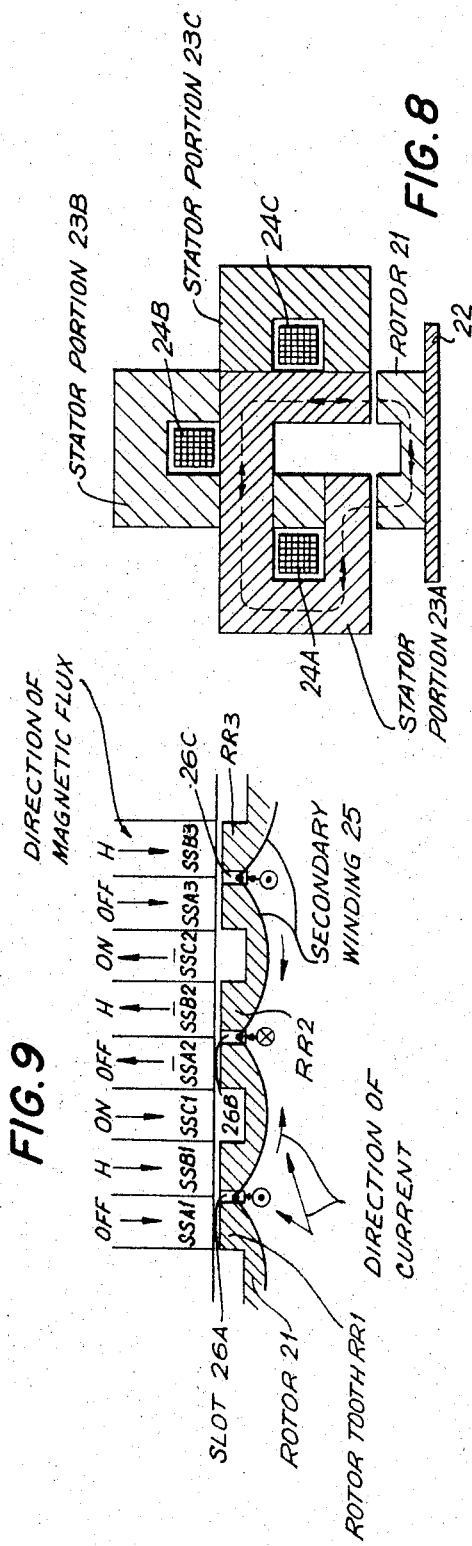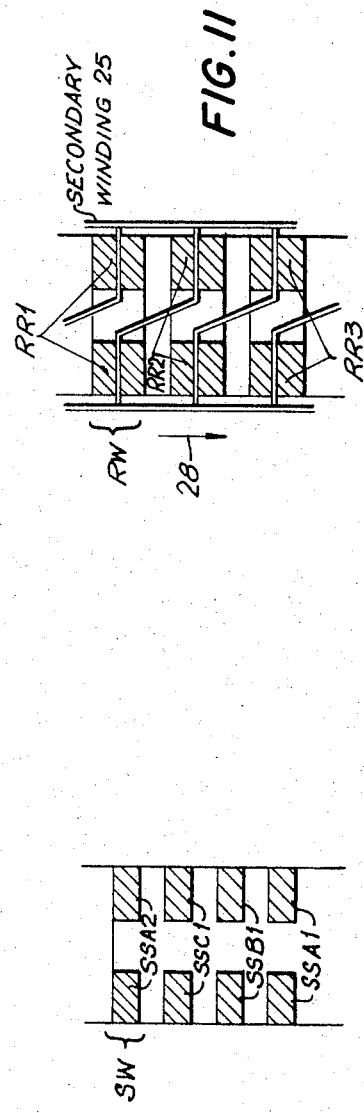

United States Patent Office 3,437,854
Patented Apr. 8, 1969

1

3,437,854
ELECTRIC ROTARY STEP MOTOR WITH PLURAL
OFFSET STATOR WINDINGS
Mitsuo Oiso, Kawasaki-shi, Japan, assignor to Fujitsu
Limited, Kawasaki, Japan, a corporation of Japan
Filed Nov. 4, 1966, Ser. No. 592,180
Claims priority, application Japan, Nov. 8, 1965,
40/68,399; Nov. 13, 1965, 40/69,598
Int. Cl. H02k 37/00
U.S. Cl. 310—49                 5 Claims The present invention relates to an electric step motor. More particularly, the invention relates to a low inertia, high torque electric step motor.

The principal object of the present invention is to provide a new and improved electric step motor. The electric step motor of the present invention has a low inertia and a high torque and excellent, highly desirable starting characteristics. The electric step motor of the present invention is efficient, effective and reliable in operation and is of simple structure. There is almost no eddy current loss in the step motor of the present invention.

In accordance with the present invention, an electric step motor of low inertia and high torque comprises a rotatably mounted rotor having a peripheral surface and a plurality of spaced teeth extending outwardly from the peripheral surface. Each of the teeth of the rotor has a first determined width in a circumferential direction. A plurality of fixedly mounted stator portions is coaxially positioned around the rotor, each of the stator portions has an inner circumferential surface and a plurality of spaced teeth extending inwardly from the inner circumferential surface toward the teeth of the rotor, each of the teeth of each of the stator portions has a second determined width in a circumferential direction which is less than half the first determined width. An excitation winding is provided in each of the stator portions for rotating the rotor step by step upon simultaneous and successive excitation of selected ones of the excitation windings.

In one embodiment of the present invention the rotor comprises a plurality of rotor portions and the number of stator portions exceeds the number of rotor portions. An electrically conductive annular member is coaxially positioned around each of the rotor portions.

In another embodiment of the present invention, the rotor comprises a single unit having a secondary winding thereon.

In order that the present invention may be readily carried into effect, it will now be described with reference to the accompanying drawings, wherein:

FIG. 8 is a sectional view, taken along the axis, of part of another embodiment of the electric step motor of the present invention;

FIG. 9 is a schematic diagram explaining the operation of the step motor of FIG. 8;

FIG. 10 is a developed projection of the stator teeth;

2

Figure 12:
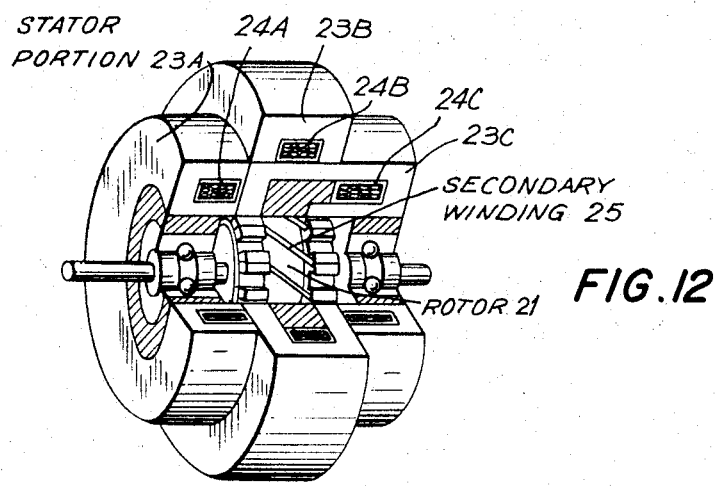

FIG. 11 is a developed projection of the rotor indicating the rotor teeth and the secondary winding; and FIG. 12 is a perspective, cutaway view, partly in section, of the electric step motor of the present invention shown in FIG. 8.

Figure 2:
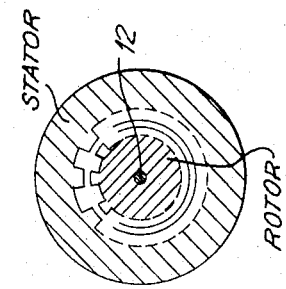
FIG. 2 is a sectional view, taken perpendicular to the axis, of the embodiment of FIG. 1.
Figure 1:
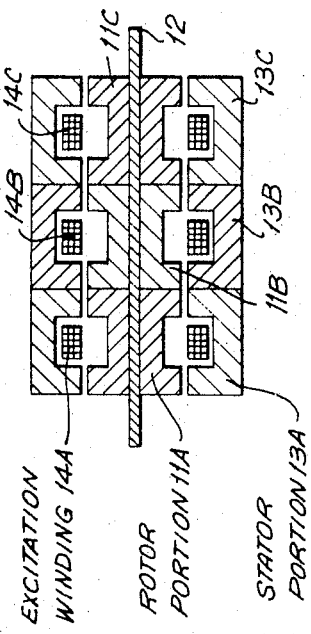
FIG. 1 is a sectional view, taken along the axis, of an embodiment of an electric step motor of the prior art.

In the electric step motor of the prior art, as shown in FIGS. 1 and 2, which is a three phase step motor, three rotor portions 11A, 11B and 11C, respectively, are coaxially mounted on a shaft 12 in adjacent relationship along the axis. Three stator portions 13A, 13B and 13C, respectively, are coaxially mounted in adjacent relationship along the axis, the stator portion 13A being around the rotor portion 11A, the stator portion 13B being around the rotor portion 11B and the stator portion 13C being around the rotor portion 11C.

Figure 3:
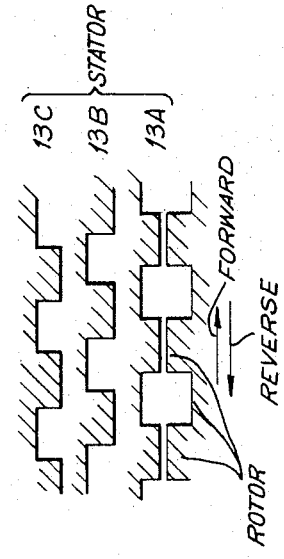
FIG. 3 is a schematic diagram explaining the operation of the step motor of FIGS. 1 and 2.

The stator portion 13A has an annular excitation winding 14A. The stator portion 13B has an annular excitation winding 14B. The stator portion 13C has an annular excitation winding 14C. As shown in FIGS. 2 and 3, each of the rotor portions 11A, 11B and 11C has teeth formed therein and extending outwardly therefrom and each of the stator portions 13A, 13B and 13C has teeth formed therein and extending inwardly therefrom. The rotor teeth have substantially the same width as the stator teeth.

If the rotor teeth are aligned so that the teeth of the three rotor portions 11A, 11B and 11C are aligned parallel to the axis of said rotor portions, and if the stator teeth are positioned so that the teeth of each stator portion are angularly displaced from the teeth of the next adjacent stator portion by one third the pitch, the rotor rotates the angular distance of one pitch each time a stator winding is excited or energized, when the stator windings are separately excited in the order 14A, 14B, 14C.

Figure 4:
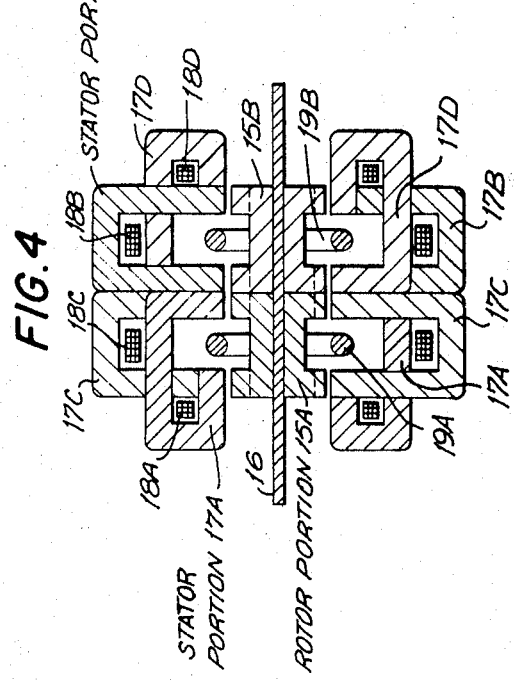
FIG. 4 is a sectional view, taken along the axis, of an embodiment of the electric step motor of the present invention.
Figure 5:
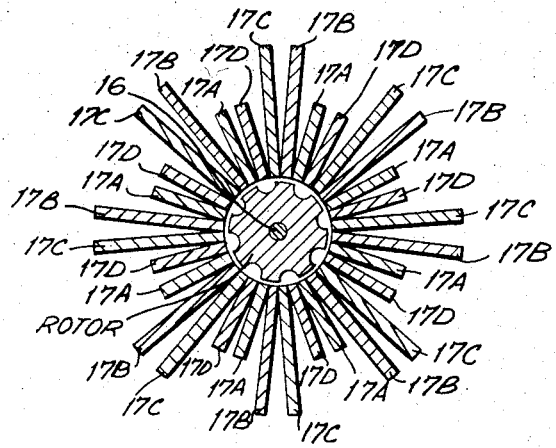
FIG. 5 is a sectional view, taken perpendicular to the axis, of the embodiment of FIG. 4.
Figure 7:
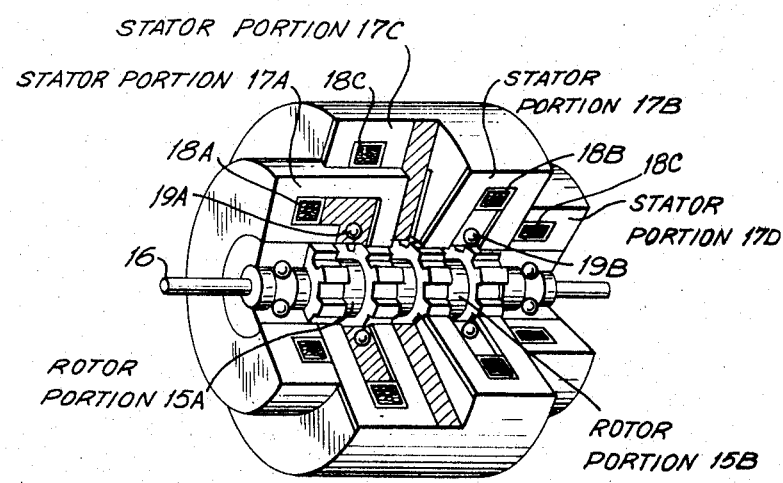
FIG. 7 is a perspective, cutaway view, partly in section, of the electric step motor of the present invention shown in FIGS. 4 and 5.

In FIGS. 4 and 5, which disclose an embodiment of the electric step motor of the present invention, two rotor portions or sections 15A and 15B are coaxially mounted on a shaft 16 in adjacent relationship along the axis. Four stator portions or sections 17A, 17B, 17C and 17D, respectively, are coaxially mounted in adjacent relationship along the axis, the stator portions 17A and 17C being around the rotor portion 15A and the stator portions 17B and 17D being around the rotor portion 15B.

The stator portion 17A has a substantially C-shaped configuration in diametrical section, with the ends of the arms of the C bent toward each other, in parallel with the trunk of the C, and then bent inward, toward said trunk and parallel to each other. The stator portion 17C has a substantially square O or double U-shaped configuration in diametrical section, with the U's opening toward each other. The stator portions 17A and 17C are alternately positioned around the rotor portion 15A (FIG. 5).

The stator portion 17B has a substantially square O or double U-shaped configuration in diametrical section, with the U's opening toward each other. The stator portion 17D has a substantially C-shaped configuration in diametrical section, with the ends of the arms of the C bent toward each other, in parallel with the trunk of the C, and then bent inward, toward said trunk and parallel to each other. The stator portions 17B and 17D are alternately positioned around the rotor portion 15B (FIG. 5).

Figure 6:
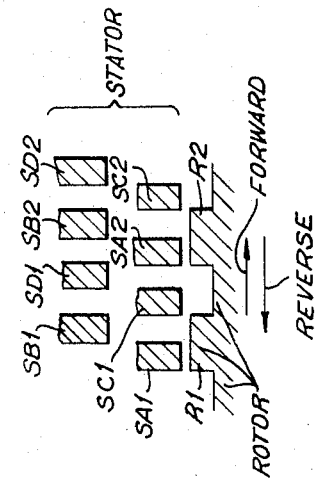
FIG. 6 is a schematic diagram explaining the operation of the step motor of FIGS. 4 and 5.

The stator portion 17A has an annular excitation winding 18A. The stator portion 17B has an annular excitation winding 18B. The stator portion 17C has an annular excitation winding 18C. The stator portion 17D has an annular excitation winding 18D. As shown in FIGS. 5 and 6, each of the rotor portions 15A and 15B has teeth formed therein and extending outwardly therefrom and each of the stator portions 17A, 17B, 17C and 17D has teeth formed therein and extending inwardly therefrom.

A short ring or annular member 19A of electrically conductive material is coaxially positioned around the rotor portion 15A. A short ring or annular member 19B of electrically conductive material is coaxially positioned around the rotor portion 15B.

The relation of the rotor teeth R1, R2 and so on and the stator teeth SA1, SB1, SC1, SD1, SA2, SB2, SC2, SD2 and so on is shown in FIGS. 5 and 6. The rotor teeth are aligned so that the teeth of the two rotor portions 15A and 15B are aligned parallel to the axis of said rotor portions. The width of each of the stator teeth SA1, SB1, SC1, SD1, SA2, SB2, SC2, SD2 and so on is less than half the width of each of the rotor teeth R1, R2 and so on, as shown in FIG. 6. Two stator teeth are provided for each rotor tooth.

In peripheral or circumferential position, the tooth SA1 corresponds to the stator portion 17A, the tooth SB1 corresponds to the stator portion 17B and is peripherally or angularly spaced from the tooth SA1, the tooth SC1 corresponds to the stator portion 17C and is peripherally or angularly spaced from the tooth SB1, the tooth SD1 corresponds to the stator portion 17D and is peripherally or angularly spaced from the tooth SC1, the tooth SA2 corresponds to the stator portion 17A and is peripherally or angularly spaced from the tooth SD1, the tooth SB2 corresponds to the stator portion 17B and is peripherally or angularly spaced from the tooth SA2, and so on.

If an electric current is supplied to the windings 18A and 18B of the stator simultaneously, the rotor teeth R1, R2, and so on, are attracted to the position in which they face the teeth SA1, SB1, SA2, SB2, and so on, of the stator, as shown in FIG. 6. If the current supply to the winding 18A is cut off and the current is supplied to the windings 18B and 18C, the rotor teeth R1, R2, and so on, are attracted to the position in which they face the teeth SB1, SC1, SB2, SC2, and so on, of the stator. The rotor is thus rotated step by step by the successive excitation of the stator excitation windings 18A and 18B, 18B and 18C, 18C and 18D, 18D and 18A, 18A and 18B, and so on.

The current supplied to the windings 18A, 18B, 18C and 18D should be such that the magnetic flux in the rotor is always in a constant direction. The inertia of the rotor of the step motor of the present invention is only two thirds the inertia of a step motor of the prior art having the same rotor dimensions.

If an external torque sufficient to rotate the rotor rapidly, is applied to said rotor when some stator portions such as, for example, 17A and 17B are in a state of excitement, the magnetic flux passing through the rotor at such time tends to decrease rapidly. An electromotive force, which operates to prevent the magnetic flux in the rotor from decreasing, is generated in the short rings or annular members 19A and 19B. The electromotive force produces an electric current in the short rings or anular members 19A and 19B. The current in the rings 19A and 19B presents a strong resistance to the rapid decrease of magnetic flux in the rotor.

Although the magnetic flux passing through the rotor portions of a known step motor varies from zero to a maximum, the magnetic flux passing through the rotor portions 15A and 15B of the step motor of the present invention varies very little. This permits the improvement of the characteristic of the step motor of the present invention by utilization of the short rings or annular members 19A and 19B. Furthermore, there is almost no eddy current loss in the step motor of the present invention. The rings or annular members 19A and 19B absorb any variation of the load on the step motor and enable the effective use of the essential torque of the motor.

The energy which provides the magnetic flux in an electric step motor is the energy which produces the torque of such motor. It has heretofore been considered impossible to improve the performance of a step motor, since the magnetic flux density is limited by the material and the area through which the magnetic flux passes is limited by inertia. Thus, for example, it is difficult to manufacture a step motor if the pitch of the rotor and stator teeth is decreased and if the driving frequency is increased and the variation of the magnetic flux is increased.

Another embodiment of the step motor of the present invention is illustrated in FIGS. 8 to 12. In such embodiment of the invention, the variation of the magnetic flux between the negative saturation point and the positive saturation point is utilized, instead of the variation of the magnetic flux between zero and the saturation point as utilized in a known electric step motor. The flux variation in the step motor of the present invention is achieved by providing a coaxial secondary winding around the rotor. The secondary winding increases the torque and improves the damping and performance of the motor.

In FIG. 8, which discloses part of the other embodiment of the electric step motor of the present invention, a rotor 21 is coaxially mounted on a shaft 22. Three stator portions or sections 23A, 23B and 23C, respectively, are coaxially mounted in adjacent relationship along the axis, said stator portions being around said rotor. The stator portions 23A and 23C are oppositely directed relative to the rotor 21.

The stator portion 23A has a substantially C-shaped configuration in diametrical section, with the ends of the arms of the C bent toward each other in parallel with the trunk of the C, and then bent inward, toward said trunk and parallel to each other. The stator portion 23B has a substantially square O or double U-shaped configuration in diametrical section, with the U's opening toward each other. The stator portion 23C has a substantially C-shaped configuration in diametrical section, with the ends of the arms of the C bent toward each other, in parallel with the trunk of the C, and then bent inward, toward said trunk and parallel to each other. The stator portion 23B is positioned between the stator portions 23A and 23C and is of greater diameter than said stator portions.

The stator portion 23A has an annular excitation winding 24A. The stator portion 23B has an annular excitation winding 24b. The stator portion 23C has an annular excitation winding 24C. As shown in FIGS. 9, 10 and 11, the rotor 21 has teeth formed therein and extending outwardly therefrom and each of the stator portions 23A, 23B and 23C has teeth formed therein and extending inwardly therefrom.

A secondary winding 25 is wound on the rotor 21. As shown in FIG. 9, the secondary winding 25 is positioned in a notch, slit or channel formed in each rotor tooth. The rotor tooth RR1 has a notch, slit, channel or slot 26A formed therein at its central portion. The rotor tooth RR2 has a notch, slit, slot or channel 26B formed therein at its central portion. The rotor tooth RR3 has a notch, slit, channel or slot 26C formed therein at its central portion.

The relation of the rotor teeth RR1, RR2, RR3 and so on and the stator teeth SSA1, SSB1, SSC1, SSA2, SSB2, SSC2, SSA3, SSB3 and so on is shown in FIG. 9. The width of each of the stator teeth SSA1, SSB1, SSC1, SSA2, SSB2, SSC2, SSA3, SSB3 and so on is less than half the width of each of the rotor teeth RR1, RR2, RR3 and so on, as shown in FIG. 9. Two stator teeth are provided for each rotor tooth. Thus, the stator teeth SSA1 and SSB1 are provided for the rotor tooth RR1, and the stator teeth SSA2 and SSB2 are provided for the rotor tooth RR2. The stator tooth SSC1 is provided for the space between the rotor teeth RR1 and RR2, and the stator tooth SSC2 is provided for the space between the rotor teeth RR2 and RR3.

If the stator portions 23A and 23B are excited by the excitation of their excitation windings 24A and 24B, and magnetic fluxes in the directions shown in FIG. 9 are produced, the rotor stops in a position in which the rotor and stator teeth are in the positions shown in said figure. The stator teeth SSA2, SSB2 and SSC2 are marked $SS\overline{A}2$, $SS\overline{B}2$ and $SS\overline{C}2$ to indicate that the magnetic flux direction is reversed.

If the excitation of the stator portion 23A is halted by the cutting off of the current flow to its excitation winding 24A, and the excitation of the stator portion 23B is maintained, the stator portion 23C becomes excited. The magnetic flux produced by the stator portion 23A decreases rapidly, upon the de-excitation of said stator portion, so that electric current flows in the secondary winding 25 on the rotor 21 in the directions shown in FIG. 9 and supplement the magnetic flux.

The electric current in the secondary winding 25 interacts with the magnetic flux produced by the stator portion 23B to produce a torque which rotates the rotor 21 to the right in FIG. 9. The rotor teeth RR1, RR2, RR3 and so on are rotated or moved rapidly to the right in FIG. 9 by the magnetic flux produced by the stator portions 23B and 23C and by the interaction of the current in the secondary winding 25 and the magnetic flux in the stator portion 23B. The rotor teeth are thus attracted to positions facing the stator teeth SSB1, SSC1 and SSB2, SSC2, and so on.

If the rotor 21 is to be rotated or moved still further to the right in FIG. 9, from the position in which the rotor teeth face the stator teeth SSB1, SSC1 and SSB2, SSC2, and so on, a current is produced in the secondary winding 25 in a direction opposite to that of the aforementioned current therein. The rotor tooth RR1 is then moved or rotated to the left in FIG. 9 from a position facing the stator teeth SSB1 and SSC1 to its initial position facing the stator teeth SSA1 and SSB1, by the magnetic flux produced by the stator portions 23B and 23C and the torque produced by the interaction of the current in the secondary winding 25 of the rotor 21 and the magnetic flux of the stator portion 23C. The rotor 21 is damped.

FIGS. 10 and 11 are developed projections of the stator and rotor teeth of the embodiment of FIGS. 8 and 12. Each of the rotor teeth RR1, RR2, RR3 and so on has a width of RW (FIG. 11) and each of the stator teeth SSA1, SSB1, SSC1, SSA2, SSB2, SSC2, SSA3, SSB3 and so on has a width of SW (FIG. 10). Thus, the stator tooth SSA1 faces the upper half of the rotor tooth RR3 and the stator tooth SSA2 faces the upper half of the rotor tooth RR1 (FIGS. 10 and 11). The stator tooth SSB1 faces the lower half of the rotor tooth RR2 (FIGS. 10 and 11). The relationship illustrated in FIGS. 10 and 11 is for the excitation condition of the stator portions 23A and 23B.

If the excitation of the stator portions 23A and 23B is changed to excitation of the stator portions 23B and 23C, the rotor 21 is attracted to the stator portion 23C. The rotor 21 is simultaneously subjected to a torque in the direction of an arrow 28 by the magnetic flux of the stator portion 23B and the electric current in the secondary winding 25. Thus, as in FIG. 9, each of the rotor teeth rotates or moves in the direction of the arrow 28 by half the stator pitch, and then stops. The step motor of FIGS. 8 and 12 may thus rotate step by step in the foregoing manner by the successive excitation of the stator excitation windings 24A and 24B, 24B and 24C, 24C and 24A, 24A and 24B, and so on, as tabulated in Table I.

TABLE I

| Stator portion | Step | | | | | | |
|---|---|---|---|---|---|---|---|
| | 1 | 2 | 3 | 4 | 5 | 6 | 7 |
| 23A | + | 0 | − | − | 0 | + | + |
| 23B | + | + | 0 | − | − | 0 | + |
| 23C | 0 | + | + | 0 | − | − | 0 |

In Table I, 0 indicates that current is not supplied to the excitation winding of the stator portion indicated.

The current flows through the excitation windings in directions such that the direction of the magnetic flux of alternate rotor teeth may be opposite to the direction of rotation of the rotor.

As shown in FIG. 11, the secondary winding 25 extends around both substantially planar surfaces of the rotor 21, as well as in the center slot 26A, 26B, 26C and so on of each rotor tooth RR1, RR2, RR3 and so on. The secondary winding 25 extends from the slot of a rotor tooth on one planar surface to the slot of the next adjacent rotor tooth on the other planar surface. Thus, as shown in FIG. 11, the secondary winding 25 extends from the slot of the rotor tooth RR1 on the left planar surface to the slot of the next adjacent rotor tooth RR2 on the right planar surface.

The step motor of FIGS. 8 and 12 thus utilizes as the driving force both the attractive force of the magnetic flux and the force produced by the secondary winding 25 of the rotor. Effective damping of the rotor 21 is simultaneously achieved.

While the invention has been described by means of specific examples and in specific embodiments, I do not wish to be limited thereto, for obvious modifications will occur to those skilled in the art without departing from the spirit and scope of the invention.

I claim:
1. An electric step motor of low inertia and high torque, comprising
  a rotatably mounted rotor having a peripheral surface and a plurality of spaced teeth extending outwardly from said peripheral surface, each of the teeth of said rotor having a first determined width in a circumferential direction;
  a plurality of fixedly mounted stator portions coaxially positioned around said rotor each having an inner circumferential surface and a plurality of spaced teeth extending inwardly from said inner circumferential surface toward the teeth of said rotor, each of the teeth of each of said stator portions having a second determined width in a circumferential direction which is less than half said first determined width; and
  an excitation winding provided in each of said stator portions for rotating said rotor step by step upon simultaneous and successive excitation of selected ones of said excitation windings.
2. An electric step motor as claimed in claim 1, wherein said rotor comprises a plurality of rotor portions and the number of stator portions exceeds the number of rotor portions.
3. An electric step motor as claimed in claim 1, further comprising an electrically conductive annular member coaxially positioned around said rotor.
4. An electric step motor as claimed in claim 2, further comprising an electrically conductive annular member coaxially positioned around each of said rotor portions.
5. An electric step motor as claimed in claim 1, further comprising a secondary winding on said rotor.

References Cited

UNITED STATES PATENTS

| 3,293,460 | 12/1966 | Iwai et al. | 310—49 |
| 3,327,191 | 6/1967 | Goto | 310—49 X |
| 3,375,421 | 3/1968 | Ve Nard | 310—49 X |

U.S. Cl. X.R.

310—183, 185, 210, 254